United States Patent [19]
Lee

[11] Patent Number: 5,978,048
[45] Date of Patent: Nov. 2, 1999

[54] METHOD AND APPARATUS FOR ENCODING A MOTION VECTOR BASED ON THE NUMBER OF VALID REFERENCE MOTION VECTORS

[75] Inventor: Sang-Hoon Lee, Seoul, Rep. of Korea

[73] Assignee: Daewoo Electronics Co., Inc., Rep. of Korea

[21] Appl. No.: 08/936,891

[22] Filed: Sep. 25, 1997

[51] Int. Cl.[6] .................................................. H04N 7/32
[52] U.S. Cl. ...................... 348/699; 348/402; 348/413; 348/416
[58] Field of Search .................................. 348/699, 402, 348/407, 413, 416

[56] References Cited

U.S. PATENT DOCUMENTS

| | | | |
|---|---|---|---|
| 5,767,911 | 6/1998 | Boon | 348/401 |
| 5,805,221 | 9/1998 | Lee | 348/397 |
| 5,812,787 | 9/1998 | Astle | 348/390 |
| 5,818,531 | 10/1998 | Yamaguchi | 348/403 |

FOREIGN PATENT DOCUMENTS 0720355  7/1996  European Pat. Off. .

*Primary Examiner*—Howard Britton
*Attorney, Agent, or Firm*—Anderson Kill & Olick

[57] ABSTRACT

A current motion vector is encoded based on reference motion vectors. First, the number of valid reference motion vectors is counted. According to the number of the valid reference motion vectors, a predictor for the current motion vector is determined. That is, the predictor is determined with a horizontal and a vertical components representing medians of the horizontal and the vertical components of the valid reference motion vectors, or most precedent components of the horizontal and vertical components of the valid reference motion vectors, or 0's. The current motion vector is encoded based on the predictor by using the differential pulse coding technique and the variable length coding scheme.

10 Claims, 3 Drawing Sheets

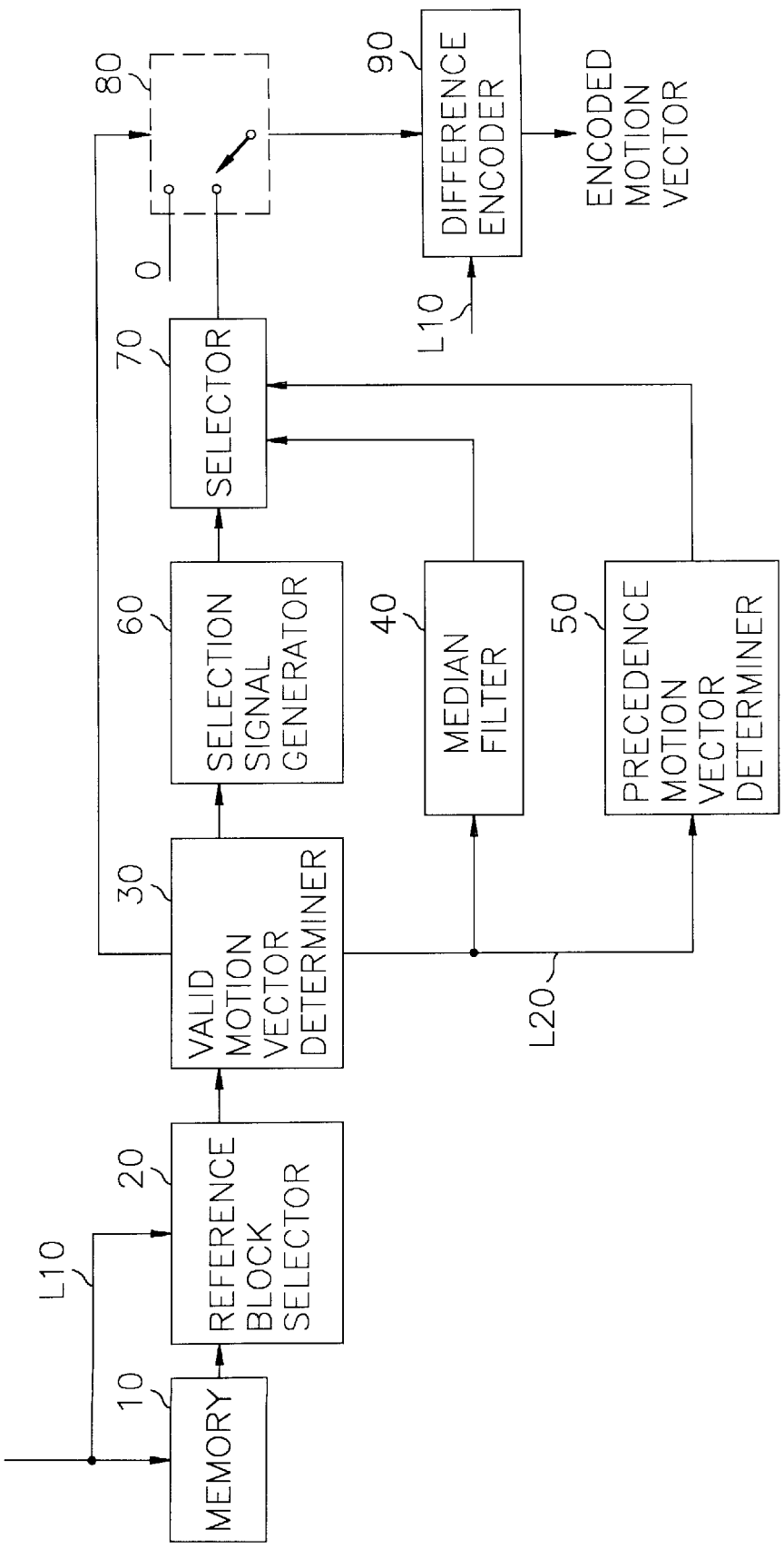

METHOD AND APPARATUS FOR ENCODING A MOTION VECTOR BASED ON THE NUMBER OF VALID REFERENCE MOTION VECTORS

FIELD OF THE INVENTION

The present invention relates to a method and apparatus for encoding a motion vector; and, more particularly, to a method and apparatus capable of encoding a motion vector of a search block based on the number of valid motion vectors of reference blocks.

DESCRIPTION OF THE PRIOR ART

In digitally televised systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is necessary to compress or reduce the volume of data through the use of various data compression techniques, especially in the case of such low bit-rate video signal encoders as video-telephone and teleconference systems.

One of such techniques for encoding video signals for a low bit-rate encoding system is an object-oriented analysis-synthesis coding technique, wherein an input video image is divided into objects and three sets of parameters for defining the motions, the contours, and the pixel data of each object are processed through different encoding channels.

One example of such object-oriented coding scheme is the so-called MPEG (Moving Picture Experts Group) phase 4 (MPEG-4), which is designed to provide an audio-visual coding standard for allowing content-based interactivity, improved coding efficiency and/or universal accessibility in such applications as low-bit rate communications, interactive multimedia (e.g., games, interactive TV and the like) and surveillance (see, for instance, MPEG-4 Video Verification Model Version 2.0, International Organization for Standardization, ISO/IEC JTC1/SC29/WG11 N1260, March 1996).

According to MPEG-4, an input video image is divided into a plurality of video object planes (VOP's), which correspond to entities in a bitstream that a user can have access to and manipulate. A VOP can be referred to as an object and represented by a bounding rectangle whose width and height may be chosen to be smallest multiples of 16 pixels (a macro block size) surrounding each object so that the encoder processes the input video image on a VOP-by-VOP basis, i.e., an object-by-object basis. The VOP includes color information consisting of the luminance component (Y) and the chrominance components (Cr, Cb) and contour information represented by, e.g., a binary mask.

Also, among various video compression techniques, the so-called hybrid coding technique, which combines temporal and spatial compression techniques together with a statistical coding technique, is known to be most effective.

Most hybrid coding techniques employ a motion compensated DPCM (Differential Pulse Coded Modulation), two-dimensional DCT (Discrete Cosine Transform), quantization of DCT coefficients, and VLC (Variable Length Coding). The motion compensated DPCM is a process of estimating the movement of an object between a current frame and its previous frame, and predicting the current frame according to the motion flow of the object to produce a differential signal representing the difference between the current frame and its prediction.

Specifically, in the motion compensated DPCM, current frame data is predicted from the corresponding previous frame data based on an estimation of the motion between the current and the previous frames. Such estimated motion may be described in terms of two dimensional motion vectors representing the displacements of pixels between the previous and the current frames.

There have been two basic approaches to estimate the displacements of pixels of an object. Generally, they can be classified into two types: one is a block-by-block estimation and the other is a pixel-by-pixel approach.

In the pixel-by-pixel approach, the displacement is determined for each and every pixel. This technique allows a more exact estimation of the pixel value and has the ability to easily handle scale changes and non-translational movements, e.g., scale changes and rotations, of the object. However, in the pixel-by-pixel approach, since a motion vector is determined at each and every pixel, it is virtually impossible to transmit all of the motion vectors to a receiver.

Using the block-by-block motion estimation, on the other hand, a current frame is divided into a plurality of search blocks. To determine a motion vector for a search block in the current frame, a similarity calculation is performed between the search block in the current frame and each of a plurality of equal-sized reference blocks included in a generally larger search region within a previous frame. An error function such as the mean absolute error or mean square error is used to carry out the similarity measurement between the search block in the current frame and one of the reference blocks in the search region of the previous frame. And the motion vector, by definition, represents the displacement between the search block and a reference block which yields a minimum error function.

Referring to FIG. 2, there is shown a schematic block diagram of a conventional apparatus for encoding a motion vector of a search block based on a first valid motion vector of a reference block.

Motion vector information on shape and texture for each search block in the current frame is sequentially inputted to a memory 10, a reference block selector 15 and a difference encoder 17, wherein the motion vector information on a search block includes position data of the search block in the current frame and a motion vector thereof, the motion vector being represented by a horizontal and a vertical components thereof. The memory 10 stores the motion vectors by using the position data thereof as addresses.

The reference block selector 15 determines reference search blocks of a current search block based on position data thereof and retrieves motion vectors of the reference search blocks ("reference motion vectors") from the memory 10, the reference search blocks having predetermined positional relationship to the current search block. For instance, as disclosed in MPEG-4, Video Verification Model Version 7.0, ISO/IEC JTC1/SC29/WG11, MPEG97/1642, also as shown in FIG. 1, in a shape mode, three blocks positioned at the left, upper, upper-right of the current search block can be determined as the reference search blocks. On the other hand, in a shape-texture combined mode, total six blocks are determined with respect to each shape and texture. The three reference motion vectors in case of the shape mode or the six reference motion vectors in case of the shape-texture combined mode are provided to a predictor determiner 16 as reference motion vectors for the motion vector of the current search block ("current motion vector"). In response to the reference motion vectors, the predictor determiner 16 arranges the reference motion vectors in a certain order, e.g., MVs1, MVs2, MVs3, MV1, MV2, MV3 as shown in Fig. 1 and determines a first valid reference motion vector, i.e., a valid reference motion vector detected first, as a predictor for the current motion vector and provides same to the difference encoder 17, wherein the valid reference motion vector is a motion vector whose corresponding reference block comprises a boundary of an object.

The difference encoder 17 finds a difference between the current motion vector and the predictor thereof based on a DPCM technique and encodes the difference by using, e.g., VLC technique. The encoded difference is then transmitted to a decoder of a receiving end as encoded motion vector for the current search block.

By encoding a motion vector of a search block based on a predictor thereof, the amount of data representing the motion vector can be effectively reduced, since the difference between the motion vector and the predictor thereof is normally smaller than the motion vector itself in most cases.

In certain case, however, for instance, if valid reference motion vectors following the first one are more similar to the current motion vector than the first one, the conventional predictor determination scheme based on the simple selection described above may not produce an optimum predictor of a motion vector, resulting in a degraded coding efficiency.

SUMMARY OF THE INVENTION

It is, therefore, an object of the invention to provide a method and apparatus capable of determining an optimum predictor of a motion vector thereby improving a coding efficiency of the motion vector.

In accordance with one aspect of the present invention, there is provided a method for encoding a current motion vector based on a plurality of reference motion vectors, wherein each motion vector includes a first and a second components, the method comprising the steps of:

(a) finding valid reference motion vectors for shape in a shape mode or for shape and texture in a shape-texture combined mode, wherein said valid reference motion vector is a motion vector whose corresponding reference block comprises a boundary of an object;

(b) counting said valid reference motion vectors and generating a first selection signal, if the number of said valid reference motion vectors is equal to 0, and if otherwise, generating a second selection signal;

(c) determining a predictor for a current motion vector among said valid reference motion vectors found in step (a), wherein said predictor is selected first from said valid reference motion vectors for shape if there is at least one valid reference motion vector for shape, and if otherwise, selected from said valid reference motion vectors for texture in case of the shape-texture combined mode;

(d) selecting 0 value in response to said first selection signal generated in step (b) or selecting said predictor determined in step (c) in response to said second selection signal generated in step (b), thereby determining an optimum predictor; and (e) encoding a difference between a first component of said current motion vector and a first component of said optimum predictor determined in step (d) and a difference between a second component of said current motion vector and a second component of said optimum predictor determined in step (d), thereby generating encoded data of said current motion vector.

In accordance with another aspect of the present invention, there is provided an apparatus for encoding a current motion vector based on a plurality of reference motion vectors, each of the motion vectors including a first and a second components, comprising:

means for finding valid reference motion vectors for shape in a shape mode or for shape and texture in a shape-texture combined mode, wherein said valid reference motion vector is a motion vector whose corresponding reference block comprises a boundary of an object;

means for counting said valid reference motion vectors and generating a first selection signal, if the number of said valid reference motion vectors is equal to 0, and if otherwise, generating a second selection signal;

means for determining a predictor for a current motion vector among said valid reference motion vectors found at said finding means, wherein said predictor is selected first among said valid reference motion vectors for shape if there is at least one valid reference motion vector for shape and if otherwise, selected from said valid reference motion vectors for texture in case of the shape-texture combined mode;

means for selecting 0 value in response to said first selection signal generated at said counting means or selecting said predictor determined at said determining means in response to said second selection signal generated at said counting means, thereby determining an optimum predictor; and means for encoding a difference between a first component of said current motion vector and a first component of said optimum predictor determined at said selecting means and a difference between a second component of said current motion vector and a second component of said optimum predictor determined at said selecting means, thereby generating encoded data of said current motion vector.

BRIEF DESCRIPTION OF THE DRAWINGS

The above and other objects and features of the present invention will become apparent from the following description of preferred embodiments given in conjunction with the accompanying drawings, in which:

FIG. 3 presents a block diagram of an apparatus 100 for encoding a motion vector of a search block in accordance with the present invention.

DETAILED DESCRIPTION OF THE PREFERRED EMBODIMENTS

Figure 1:
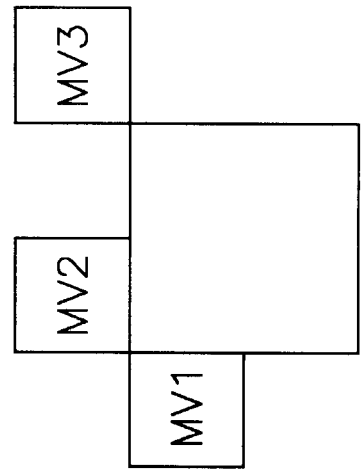
FIG. 1 provides a exemplary block diagram of reference motion vectors for shape and texture.
Figure 1:
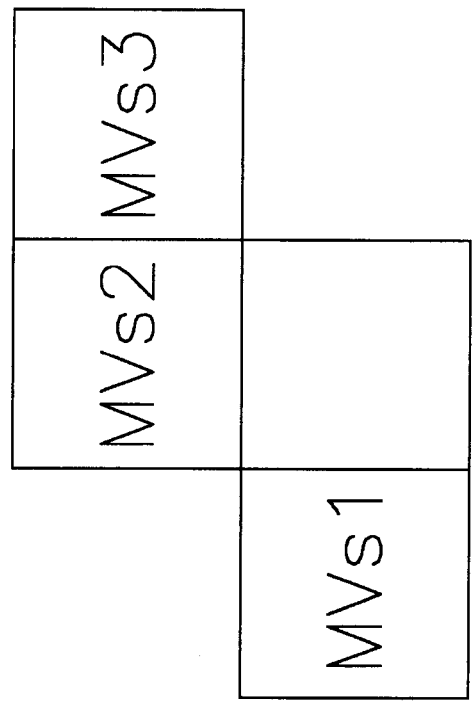
Figure 2:
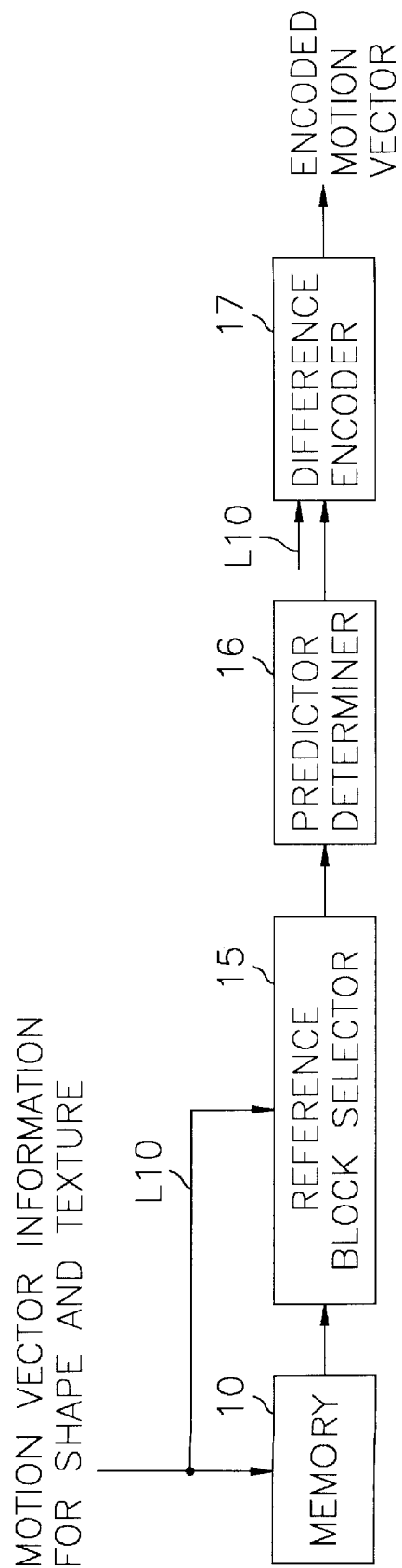
FIG. 2 shows a schematic block diagram of a conventional apparatus for encoding a motion vector of a search block by selecting a first valid reference motion vector as a predictor for a current motion vector.

Referring to FIG. 3, there is shown a block diagram of an apparatus 100 for encoding a motion vector of a search block in accordance with the present invention, wherein a current frame is divided into a plurality of search blocks of an identical size and a previous frame is divided into a multiplicity of equal-sized reference blocks included in a generally larger search region. To determine a motion vector for a search block, a similarity calculation is carried out between the search block in the current frame and each of reference blocks in the search region corresponding to the search block by employing an error function. The motion vector represents a displacement between the search block in the current frame and the reference block within the corresponding search region of the previous frame which yields a minimum error function. Motion vector information on shape and texture for each of the search blocks within the current frame is inputted to a memory 10, a reference block selector 20 and a difference encoder 90 via a line L10, wherein the motion vector information represents position data of a current search block and a motion vector thereof, the motion vector being represented by a horizontal and a vertical components thereof.

The memory 10 stores therein the motion vector for each search block by using the position data thereof.

The reference block selector 20 determines reference search blocks of the current search block based on position data thereof and retrieves motion vectors of the reference search blocks ("reference motion vectors") from the memory 10. In a preferred embodiment of the invention, three search blocks positioned at the left, the upper and the upper-right of the current search block are selected as the reference search blocks in a same manner as in the MPEG-4 verification model 7.0 described above. In another instance of the invention, another set of search blocks, e.g., at the left, the upper and the upper-left of the current search block can be decided as the reference search blocks. In any cases, it is preferable to set the number of the reference search blocks to be an odd number in order to facilitate the median filtering of the motion vectors thereof.

The motion vectors of the reference search blocks, each motion vector being comprised of a horizontal and a vertical components, are provided to a valid motion vector determiner 30 as reference motion vectors for the motion vector of the current search block ("current motion vector").

At the valid motion vector determiner 30, valid reference motion vectors are counted, wherein the valid reference motion vector is a motion vector whose corresponding reference block comprises a boundary of an object. In a shape-texture combined mode, the valid reference motion vectors for shape and texture are counted together. If the number of the valid reference motion vectors for shape in a shape mode or the combined number of the valid reference motion vectors for shape and texture in the shape-texture combined mode is equal to 0, a first selection signal is provided to a switch 80; and if otherwise, a second selection signal is provided thereto. Meanwhile, the number of the valid reference motion vectors for shape is first provided to a selection signal generator 60. If none of the reference motion vectors for shape are valid and in case of the shape-texture combined mode, the number of the valid reference motion vectors for texture will be provided to the selection signal generator 60.

Hereinafter, the reference motion vector means the reference motion vector for shape. However, in the shape-texture combined mode, if none of the reference motion vectors for shape are valid, the reference motion vector means the reference motion vector for texture.

Meanwhile, the valid reference motion vectors are provided to a median filter 40 and a precedence motion vector selector 50 via a line L20.

The median filter 40 determines a median vector as a predictor based on the reference motion vectors fed from the valid motion vector determiner 30. For instance, a horizontal and a vertical components MV_MED_x and MV_MED_y of the median vector MV_MED are computed as:

$$MV\_MED\_x = \text{median}(MV_{1x}, MV_{2x}, \ldots, MV_{Nx})$$

$$MV\_MED\_y = \text{median}(MV_{1y}, MV_{2y}, \ldots, MV_{Ny})$$

wherein $MV_{ix}$ and $MV_{iy}$ are horizontal and vertical components of an $i_{th}$ reference motion vector, respectively, i being 1, 2 ..., N with N being a total number of reference motion vectors. For instance, if N=3 and $MV_1$=(-2,3), $MV_2$=(1,5) and $MV_3$=(-1,7), then MV_MED_x=-1 and MV_MED_y=5. The computed horizontal and vertical components of the median vector is provided to a selector 70.

Meanwhile, the precedence motion vector selector 50 arranges the valid reference motion vectors in a predetermined order, e.g., the left, the upper, the upper-right of the current search block and selects a first valid reference motion vector as a predictor for the current motion vector and provides same to the selector 70, the first valid reference motion vector being a valid reference motion vector detected first among the valid reference motion vectors.

The selection signal generator 60 provides a first selection signal to the selector 70 if the number of the valid reference motion vectors is equal to 3, i.e., all of the reference motion vectors are valid; and the second selection signal if not all of the reference motion vectors are valid.

The selector 70 selects the predictor fed from the median filter 40 in response to the first selection signal fed from the selection signal generator 60 or selects the predictor fed from the precedence motion vector selector 50 in response to the second selection signal fed from the selection signal generator 60; and provides a selected predictor to the switch 80.

The switch 80 selects 0 value in response to the first selection signal fed from the valid motion vector determiner 30 or selects the predictor fed from the selector in response to the second selection signal fed from the valid motion vector determiner 30; and provides a selected predictor as an optimum predictor to a difference encoder 90.

The difference encoder 90 calculates, based on the conventional DPCM technique, differences between the horizontal component of the current motion vector and that of the optimum predictor and between the vertical component of the current motion vector and that of the optimum predictor; and encodes the differences based on, e.g., the VLC technique. The encoded differences are transmitted to a transmitter (not shown) for the transmission thereof.

While the present invention has been described with respect to the particular embodiments, it will be apparent to those skilled in the art that various changes and modifications may be made without departing from the spirit and scope of the invention as defined in the following claims.

What is claimed is:

1. A method for encoding a current motion vector based on a plurality of reference motion vectors, wherein a motion vector represents a displacement between a search block in a current frame and a reference block in a previous frame, and each motion vector includes a horizontal and a vertical components, the method comprising the steps of:

(a) finding valid reference motion vectors for shape in a shape mode or for shape and texture in a shape-texture combined mode, wherein said valid reference motion vector is a motion vector whose corresponding reference block comprises a boundary of an object;

(b) counting said valid reference motion vectors and generating a first selection signal, if the number of said valid reference motion vectors is equal to 0, and if otherwise, generating a second selection signal;

(c) determining a predictor for a current motion vector among said valid reference motion vectors found in step (a), wherein said predictor is selected first from said valid reference motion vectors for shape if there is at least one valid reference motion vector for shape, and if otherwise, selected from said valid reference motion vectors for texture in case of the shape-texture combined mode;

(d) selecting 0 value in response to said first selection signal generated in step (b) or selecting said predictor determined in step (c) in response to said second selection signal generated in step (b), thereby determining an optimum predictor; and (e) encoding a difference between a first component of said current motion vector and a first component of said optimum predictor determined in step (d) and a difference between a second component of said current motion vector and a second component of said optimum predictor determined in step (d), thereby generating encoded data of said current motion vector.

2. The method according to claim 1, wherein said determining step (c) includes:

(c1) determining said predictor having a first and a second components, the first component of said predictor representing a median of first components of said valid reference motion vectors for shape and the second component of said predictor denoting a median of second components of said valid reference motion vectors for shape in case that all of the reference motion vectors for shape are valid; or determining said predictor having a first and a second components, after arranging said reference motion vectors for shape in a predetermined order, the first component of said predictor representing a most precedent component among first components of said valid reference motion vectors for shape and the second component of said predictor denoting a most precedent component among second components of said valid reference motion vectors for shape in case that not all of the reference motion vectors for shape are valid;

(c2) in case that none of the reference motion vectors for shape are valid, determining said predictor having a first and a second components, the first component of said predictor representing a median of first components of said valid reference motion vectors for texture and the second component of said predictor denoting a median of second components of said valid reference motion vectors for texture in case that all of said reference motion vectors for texture are valid; or determining said predictor having a first and a second components, after arranging said reference motion vectors for texture in said predetermined order, the first component of said predictor representing a most precedent component among first components of said valid reference motion vectors for texture and the second component of said predictor denoting a most precedent component among second components of said valid reference motion vectors for texture in case that not all of said reference motion vectors for texture are valid; and (c3) determining said predictor having a first and a second components, the first component of said predictor having 0 and the second component of said predictor having 0 in case that none of said reference motion vectors for shape and texture are valid.

3. The method according to claim 2, wherein said steps (c1) and (c2) include step of arranging said valid reference motion vectors as following order: the left, the upper, the upper-right of the current search block.

4. The method according to claim 3, wherein said steps (c1) and (c2) further include step of regarding the first and the second components of said valid reference motion vectors as most precedent components in case that the number of said valid reference motion vectors is equal to 1.

5. The method according to claim 4, wherein said encoding step (e) is carried out by a VLC technique.

6. An apparatus for encoding a current motion vector based on a plurality of reference motion vectors, wherein a motion vector represents a displacement between a search block in a current frame and a reference block in a previous frame, and each motion vector includes a horizontal and a vertical components, comprising:

means for finding valid reference motion vectors for shape in a shape mode or for shape and texture in a shape-texture combined mode, wherein said valid reference motion vector is a motion vector whose corresponding reference block comprises a boundary of an object;

means for counting said valid reference motion vectors and generating a first selection signal, if the number of said valid reference motion vectors is equal to 0, and if otherwise, generating a second selection signal;

means for determining a predictor for a current motion vector among said valid reference motion vectors found at said finding means, wherein said predictor is selected first among said valid reference motion vectors for shape if there is at least one valid reference motion vector for shape and if otherwise, selected from said valid reference motion vectors for texture in case of the shape-texture combined mode;

means for selecting 0 value in response to said first selection signal generated at said counting means or selecting said predictor determined at said determining means in response to said second selection signal generated at said counting means, thereby determining an optimum predictor; and means for encoding a difference between a first component of said current motion vector and a first component of said optimum predictor determined at said selecting means and a difference between a second component of said current motion vector and a second component of said optimum predictor determined at said selecting means, thereby generating encoded data of said current motion vector.

7. The apparatus according to claim 6, wherein said determining means includes:

means for first determining said predictor having a first and a second components, the first component of said predictor representing a median of first components of said valid reference motion vectors for shape and the second component of said predictor denoting a median of second components of said valid reference motion vectors for shape in case that all of said reference motion vectors for shape are valid; or said predictor having a first and a second components, after arranging said reference motion vector for shape in a predetermined order, the first component of said predictor representing a most precedent component among first components of said valid reference motion vectors for shape and the second component of said predictor denoting a most precedent component among second components of said valid reference motion vectors for shape in case that not all of said reference motion vectors of shape are valid;

means for second determining, in case that none of the reference motion vectors for shape are valid, said predictor having a first and a second components, the first component of said predictor representing a median of first components of said valid reference motion vectors for texture and the second component of said predictor denoting a median of second components of said valid reference motion vectors for texture in case that all of said reference motion vectors for texture are valid; or said predictor having a first and a second components, after arranging said reference motion vector for texture in said predetermined order, the first component of said predictor representing a most precedent component among first components of said valid reference motion vectors for texture and the second component of said predictor denoting a most precedent component among second components of said valid reference motion vectors for texture in case that not all of said reference motion vectors for texture are valid; and means for third determining said predictor having a first and a second components, the first component of said predictor having 0 and the second component of said predictor having 0 in case that none of said reference motion vectors for shape and texture are valid.

8. The apparatus according to claim 7, wherein said first and second determining means include means for arranging said valid reference motion vectors as following order: the left, the upper, the upper-right of the current search block.

9. The apparatus according to claim 8, wherein said first and second determining means further includes means for regarding the first and the second components of said valid reference motion vectors as precedent components in case that the number of said valid reference motion vectors is equal to 1.

10. The apparatus according to claim 9, wherein said encoding means is carried out by a VLC technique.

* * * * *